D. TURNER.
POULTRY CRATE.
APPLICATION FILED MAR. 1, 1909.
923,736.
Patented June 1, 1909.
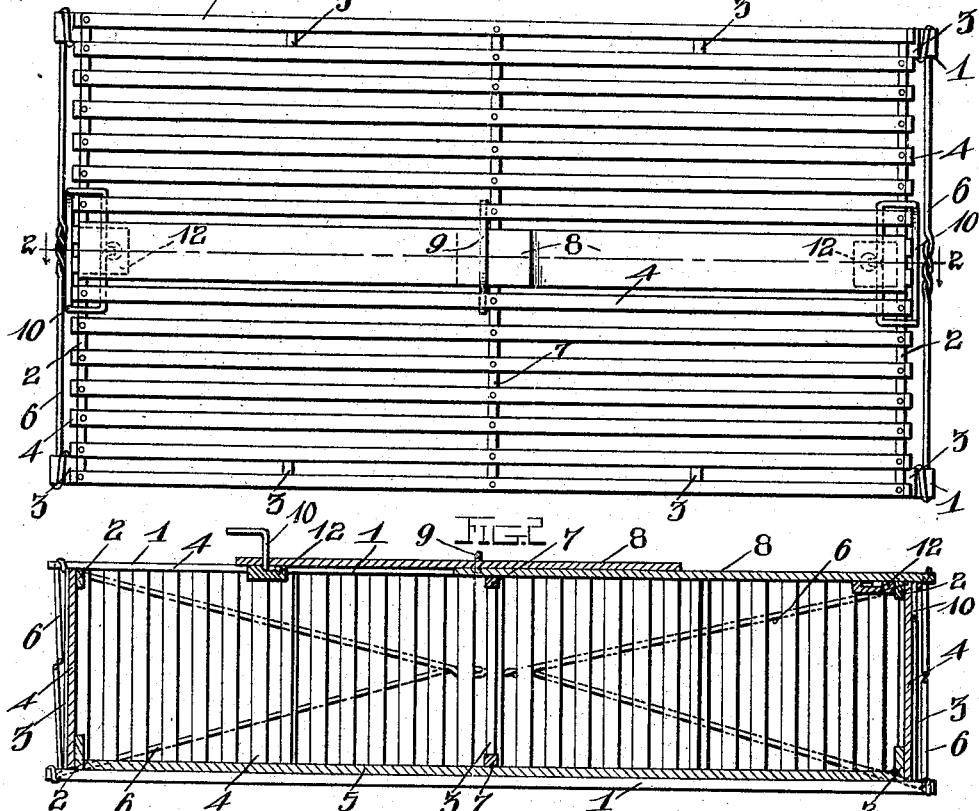
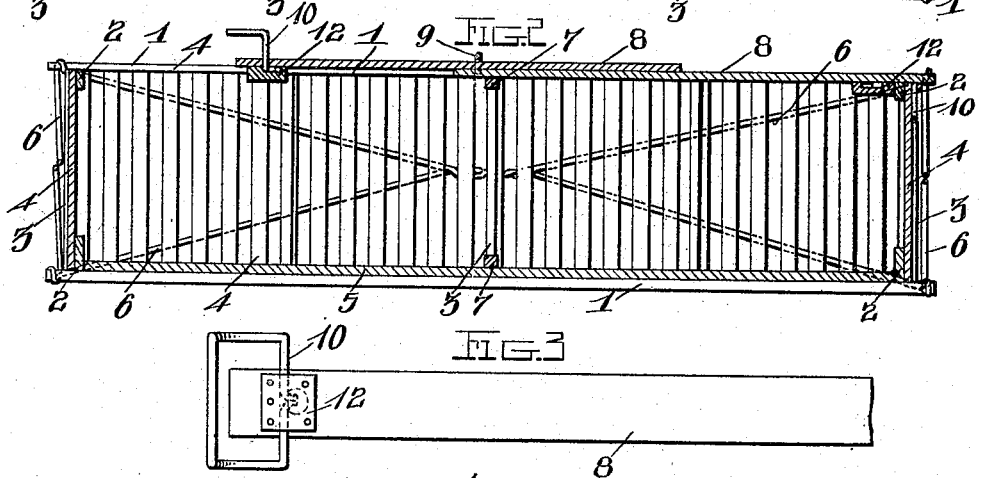
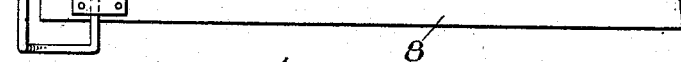
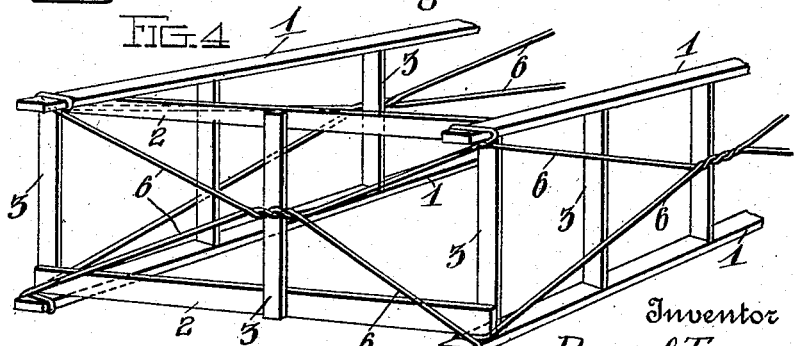
Witnesses
E. Rocker.
C. H. Griesbauer.
Inventor
Daniel Turner.
by H. B. Willson & Co.
Attorneys

UNITED STATES PATENT OFFICE.

DANIEL TURNER, OF KINGFISHER, OKLAHOMA, ASSIGNOR OF THREE-FOURTHS TO C. H. HALLADAY AND ONE-FOURTH TO IKE MEHEW, BOTH OF KINGFISHER, OKLAHOMA.

POULTRY-CRATE.

No. 923,736.  Specification of Letters Patent.  Patented June 1, 1909.

Application filed March 1, 1909. Serial No. 480,650.

*To all whom it may concern:*

Be it known that I, DANIEL TURNER, a citizen of the United States, residing at Kingfisher, in the county of Kingfisher and State of Oklahoma, have invented certain new and useful Improvements in Poultry-Crates; and I do declare the following to be a full, clear, and exact description of the invention, such as will enable others skilled in the art to which it appertains to make and use the same.

This invention relates to improvements in poultry crates.

The object of the invention is to provide a poultry crate having an improved construction of door and means for holding the same in closed position.

A further object is to provide a crate having on its ends and sides braces whereby a strong, durable construction is provided.

A further object is to provide a crate in which the lower longitudinal bars of the frame project below the bottom of the crate and form runners to facilitate the dragging of the crate.

With the foregoing and other objects in view, the invention consists of certain novel features of construction, combination and arrangement of parts, as will be more fully described and particularly pointed out in the appended claims.

In the accompanying drawings, Figure 1 is a top plan view of my improved crate, showing the construction and arrangement of the door; Fig. 2 is a vertical longitudinal sectional view, showing one of the doors in open position and the other in closed position; Fig. 3 is a bottom plan view of one of the doors; and Fig. 4 is a detail perspective view of a portion of the crate frame-work showing the arrangement of the braces on the ends and sides thereof.

In the construction of the crate, I provide a frame-work consisting of upper and lower longitudinally disposed parallel side bars 1, said lower side bars being of sufficient thickness to project below the bottom of the crate and to form runners whereby the crate may be readily drawn over the ground. The longitudinal side bars 1 are connected at the opposite ends of the crate by end cross bars 2. The cross bars 2 and side bars 1 are spaced apart by a series of vertically disposed bars 3 and on the frame thus formed are secured slats or other suitable covering 4 forming the sides, ends and top of the crate. The bottom of the crate is formed by boards 5 which are connected at their opposite ends to the lower end cross bars of the frame, as shown.

The ends and sides of the crate are braced by diagonally arranged crossed brace wires 6, the opposite ends of which are passed around and secured to the projecting ends of the upper and lower side bars 1. The brace wires 6 are twisted together at their point of crossing and by said twisting are drawn tight thus rigidly bracing the sides and ends of the crate.

The frame of the crate is also provided with centrally disposed upper and lower cross bars 7 to which the upper slats of the crate and the bottom 4 are secured. Between the two central slats of the top is formed a door space in which are arranged doors 8, said doors comprising boards of suitable width having their inner ends overlapped and slidably engaged with each other and resting upon the upper central cross bars 7. The inner overlapping ends of the door boards are held in sliding engagement by means of guide rods 9, the opposite ends of which are bent downwardly and into engagement with the under side of the adjacent slats of the top of the crate.

The outer ends of the door boards when in closed position rest upon the outer end cross bars 2 of the frame, as shown. The doors are held in closed position by means of fastening devices 10 which are in the form of open wire frames, said frames being right angular in shape and having their inner portions pivotally secured to the under side of the door boards adjacent to their outer ends by means of grooved pivoting blocks 12 which are secured to the under sides of the door boards, as shown. The inner pivoted portions of the fastening devices pass beneath and embrace the adjacent slats of the top of the crate. By thus embracing the slats, the fastening devices also serve as guides and supports for the outer ends of the doors when the latter are being moved back and forth to open or closed position.

When the door boards 8 are in closed position, the free ends of the fastening devices are adapted to be engaged or hooked over the upper end cross bars of the frame, thereby securely holding the door boards in closed position.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent is:

1. In a poultry crate, a supporting frame, side and end braces arranged on said frame, slidably mounted doors arranged in said crate, means to hold and guide the inner ends of said doors in sliding engagement, and fastening devices arranged on the outer ends of said doors and adapted to be engaged with the frame of the crate to secure the doors in closed positions, and forming supporting bars for the outer ends of the doors whereby they may be moved to open and closed positions.

2. In a poultry crate, a supporting frame, a slatted top arranged on said frame, a bottom secured to said frame, slidably mounted door boards arranged on said frame between two of the slats thereof, a holding and guiding bar arranged around the inner ends of said door boards whereby they are secured in sliding engagement, fastening devices arranged on the outer ends of said door boards, said devices comprising right angularly formed open frames secured to the under sides of the outer ends of the door boards and embracing the adjacent slats of the top of the crate, whereby the devices may be turned down into engagement with the upper end bars of the frame to secure the doors in closed position and whereby said fastening devices form guides and supports for the outer ends of the door boards when the latter are moved to their open or closed position.

In testimony whereof I have hereunto set my hand in presence of two subscribing witnesses.

DANIEL TURNER.

Witnesses:
G. LONGENDYKE,
S. S. SIMPSON.